United States Patent
Koga et al.

(10) Patent No.: US 7,322,185 B2
(45) Date of Patent: Jan. 29, 2008

(54) REMOVAL OF FRONT END BLOCKAGE OF A DIESEL PARTICULATE FILTER

(75) Inventors: Toshimasa Koga, Yokohama (JP);
Junichi Kawashima, Yokosuka (JP);
Makoto Ootake, Yokohama (JP);
Masahiko Nakano, Machida (JP);
Terunori Kondou, Yokohama (JP);
Shouichirou Ueno, Yokohama (JP);
Naoya Tsutsumoto, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/210,103

(22) Filed: Aug. 24, 2005

(65) Prior Publication Data
US 2006/0042238 A1 Mar. 2, 2006

(30) Foreign Application Priority Data
Aug. 24, 2004 (JP) ............................ 2004-243312

(51) Int. Cl.
F01N 3/00 (2006.01)
(52) U.S. Cl. ............................ 60/297; 60/274; 60/285; 60/295; 60/311
(58) Field of Classification Search ................. 60/274, 60/278, 280, 285, 287, 291, 295, 297, 311
See application file for complete search history.

(56) References Cited

U.S. PATENT DOCUMENTS

| 5,287,698 | A | * | 2/1994 | Shinzawa et al. | 60/286 |
| 5,319,930 | A | | 6/1994 | Shinzawa et al. | |
| 6,490,857 | B2 | * | 12/2002 | Sasaki | 60/278 |
| 6,820,418 | B2 | * | 11/2004 | Nakatani et al. | 60/297 |
| 6,874,316 | B2 | * | 4/2005 | Nakatani | 60/286 |
| 6,966,178 | B2 | * | 11/2005 | Saito et al. | 60/295 |

FOREIGN PATENT DOCUMENTS

| EP | 1 439 294 A2 | 7/2004 |
| EP | 1 529 929 A1 | 5/2005 |
| JP | 2002-309922 A | 10/2002 |
| WO | WO 2004/016914 A1 | 2/2004 |

* cited by examiner

Primary Examiner—Binh Q. Tran
(74) Attorney, Agent, or Firm—Foley & Lardner LLP

(57) ABSTRACT

A particulate matter deposit amount accumulated in a diesel particulate filter (4) is calculated as a first particulate matter deposit amount from a pressure loss of the filter (4) (S33). The particulate matter deposit amount accumulated in the filter (4) is calculated as a second particulate matter deposit amount from another parameter (S34). It is determined whether or not there is front end blockage of the filter (4) based on a comparison between the first particulate matter deposit amount and second particulate matter deposit amount (S36, S43). When there is a front end blockage of the filter (4), the regeneration device is controlled to perform regeneration of the filter (4) for a longer period than the normal regeneration period of the filter (4) (S22).

13 Claims, 10 Drawing Sheets

REMOVAL OF FRONT END BLOCKAGE OF A DIESEL PARTICULATE FILTER

FIELD OF THE INVENTION

This invention relates to removal of particulate matter trapped in a diesel particulate filter, and more specifically, to removal of particulate matter clogged in the frond end of the filter.

BACKGROUND OF THE INVENTION

A diesel particulate filter (hereinafter referred to as DPF) which traps particulate matter in exhaust gas discharged from a diesel engine, has the characteristic that pressure loss of the DPF increases or circulation resistance of the exhaust gas increases, as a result of an increase of a deposit amount.

If the pressure loss becomes higher than a predetermined value, it is determined that a reference value at which regeneration should be performed, has been reached, and regeneration of the DPF is performed wherein the particulate matter deposited in the DPF is burned and the DPF regenerates to a state in which it can trap again particulate matter.

Regeneration of the DPF is performed by raising the exhaust gas temperature by retarding a fuel injection timing of the diesel engine or performing a post-injection in the diesel engine. However, deposition of particulate matter in the DPF is not uniform, and there is a tendency for them to concentrate and deposit in the vicinity of the inlet of the DPF.

During regeneration, the particulate matter deposited near the inlet tend to burn with more difficulty as compared with particulate matter deposited further downstream from the DPF due to the following reasons.

In general, the DPF is cylindrical, and exhaust gas flows down the inside of the DPF along the center axis. If the exhaust gas temperature is raised for regeneration of the DPF, burning of particulate matter will occur first a little downstream from the front end of the DPF, and combustion of particulate matter will spread from there further downstream. Although particulate matter deposited downstream from the spark can use the combustion heat of upstream particulate matter for burning, particulate matter deposited near the inlet of the DPF must burn only with the heat of the exhaust gas.

Particulate matter deposited near the inlet of the DPF which cannot burn easily, but burns if sufficient regeneration time is allowed. The state where particulate matter deposited in the DPF are completely burned, is referred to as complete regeneration.

In a vehicle diesel engine, the vehicle running conditions change from moment to moment, and when the engine load is small, it is difficult to maintain the exhaust gas temperature of the diesel engine at a high level.

During regeneration of the DPF, if maintenance of exhaust gas temperature becomes difficult, regeneration of DPF is terminated at that time, and trapping of particulate matter by the DPF is resumed with some unburned particulate matter remaining mostly near the inlet.

The state where regeneration is terminated with some particulate matter remainder is referred to as a partial regeneration. This partial regeneration occurs more easily when the vehicle is driven in an urban area Particulate matter deposited near the inlet of the DPF induce further deposition of particulate matter, and the front end of the DPF becomes blocked. If the front end becomes blocked, pressure loss will be excessive as compared with the actual particulate matter deposit amount in the DPF. As a result, although the actual deposit amount has not reached the reference value for DPF regeneration, the regeneration treatment of the DPF is performed frequently and fuel consumption increases.

SUMMARY OF THE INVENTION

Regarding this tendency, Tokkai 2002-309922 published by the Japan Patent Office in 2002 proposes providing a projection on the front end of the DPF oriented upstream so that particulate matter do not adhere easily to the inlet of the DPF.

In the prior art, deposition of particulate matter near the inlet of the DPF is thereby suppressed, and the problem of increased fuel consumption due to frequent regeneration treatment of the DPF may be alleviated, but no means is provided to remove deposited particulate matter.

As mentioned above, considering that particulate matter deposited near the inlet of the DPF induce further deposition of particulate matter, in order to prevent frequent regeneration treatment of the DPF, the particulate matter deposited near the inlet of the DPF must be actively removed.

It is therefore an object of this invention to detect a blockage at the front end of the DPF with sufficient precision, and to completely remove blockages at the front end.

In order to achieve the above object, this invention provides a front end blockage removal device for use with a regeneration device for a diesel particulate filter installed in an exhaust passage of a diesel engine. The filter has a front end facing upstream of the exhaust passage and traps particulate matter in exhaust gas in the exhaust passage. The regeneration device regenerates the filter by burning the particulate matter trapped in the filter.

The removal device comprises a sensor which detects a pressure loss in the exhaust gas of the exhaust passage due to the filter, and a programmable controller programmed to calculate a first particulate matter deposit amount of the filter based on the pressure loss, calculate a second particulate matter deposit amount of the filter based on a parameter other than the pressure loss, determine whether or not a particulate matter blockage of the front end has occurred based on the first particulate matter deposit amount and second particulate matter deposit amount, and control the regeneration device to regenerate the filter when the particulate matter blockage of the front end has occurred.

This invention also provides a front end blockage removal method for the regeneration device, comprising detecting a pressure loss in the exhaust gas of the exhaust passage due to the filter, calculating a first particulate matter deposit amount of the filter based on the pressure loss, calculating a second particulate matter deposit amount of the filter based on a parameter other than the pressure loss, determining whether or not there is a particulate matter blockage of the front end based on the first particulate matter deposit amount and second particulate matter deposit amount, and controlling the regeneration device to regenerate the filter when it is determined that there is a particulate matter blockage of the front end.

The details as well as other features and advantages of this invention are set forth in the remainder of the specification and are shown in the accompanying drawings.

DESCRIPTION OF THE PREFERRED EMBODIMENTS

Figure 1:
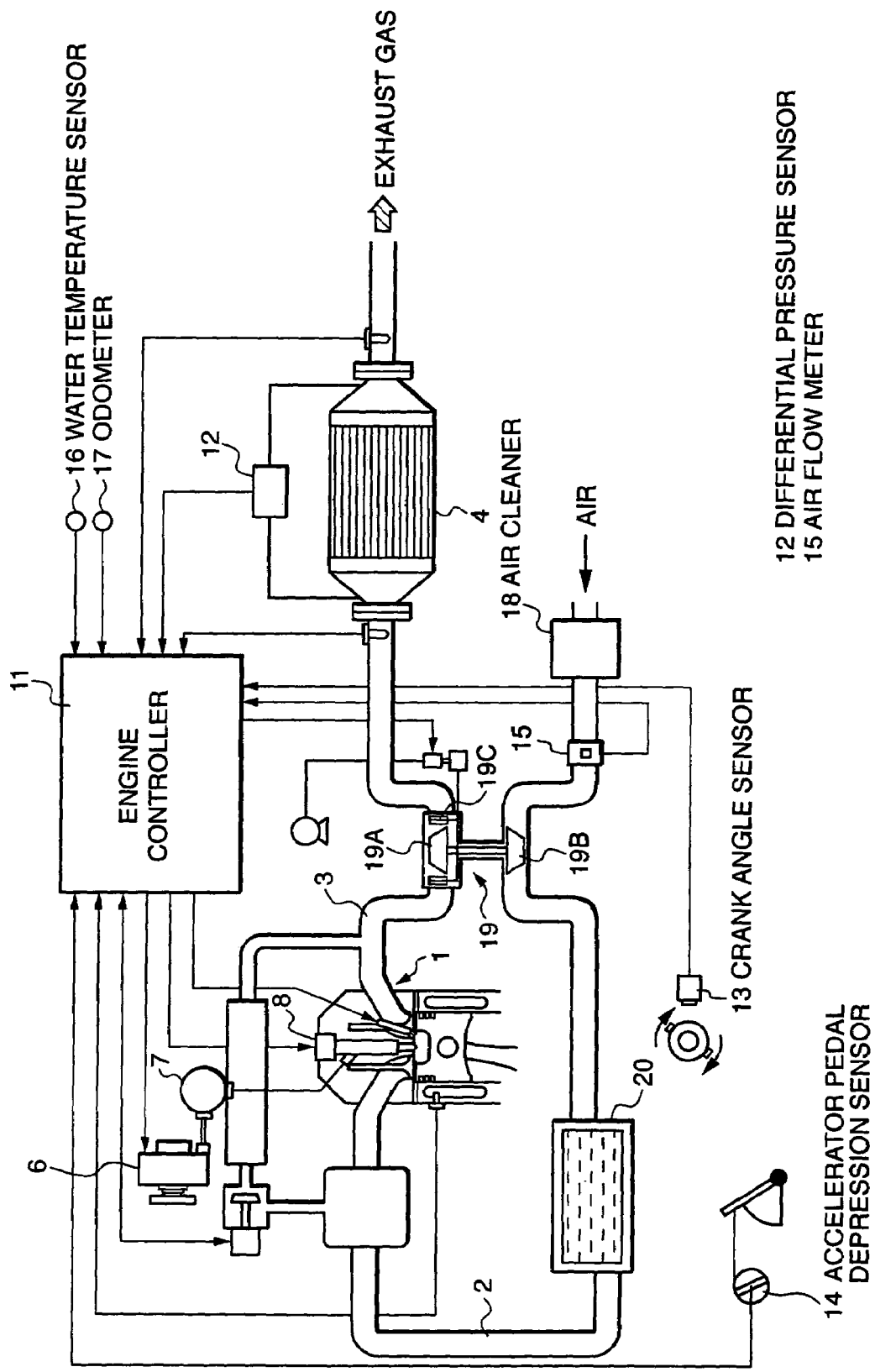
FIG. 1 is a schematic diagram of an exhaust emission controller of a diesel engine according to this invention.

Referring to FIG. 1 of the drawings, a diesel engine 1 for driving a vehicle is provided with an intake passage 2 which aspirates air, and an exhaust passage 3 which discharges exhaust gas. The intake passage 2 and exhaust passage 3 are connected to plural combustion chambers of the diesel engine 1. The diesel engine 1 is provided with an air cleaner 18 in the intake passage 2 which removes dirt from air taken in from the outside, a compressor 19B of a turbocharger 19 which pressurizes the intake air, and an intercooler 20 which cools the intake air. The diesel engine 1 is provided with a fuel injector 8 which injects fuel into the air from the intake passage 2 in the upper part of each combustion chamber. Fuel is supplied to the fuel injector 8 via a common-rail 7 from a supply pump 6.

The diesel engine 1 is provided with a turbine 19A of the turbocharger 19, and a DPF 4 in the exhaust passage 3 which traps particulate matter in the exhaust gas. The compressor 19B and the turbine 19A of the turbocharger 19 rotate together on a common rotation axis, and due to the rotation of the compressor 19B via the turbine 19A with the energy of the exhaust gas of the exhaust passage 3, compressed air is supplied to the diesel engine 1.

The turbine 19A has a "variable geometry system" wherein the cross-sectional surface area of the exhaust gas flow is throttled at low rotation speed using a variable nozzle 19C so as to maintain exhaust gas pressure. The variable nozzle 19C is driven via a diaphragm actuator according to a negative pressure.

The fuel injection amount and injection timing of the fuel injector 8, and the supply of negative pressure to the diaphragm actuator which drives the variable nozzle 19C, are respectively controlled by output signals from the engine controller 11.

The engine controller 11 comprises a microcomputer comprising a central computing unit (CPU), read-only memory (ROM), random access memory (RAM), and input/output interface (I/O interface). The controller may also comprise plural microcomputers.

For these controls, various sensors are provided, and detection data are inputted into the engine controller 11 via signal circuits.

These sensors include but are not limited to a crank angle sensor 13 which detects a crank angle of the diesel engine 1, an air flow meter 15 which detects an intake flowrate of the intake passage 2, a differential pressure sensor 12 which detects a difference of exhaust gas pressure upstream and downstream of the DPF 4, an accelerator pedal depression sensor 14 which detects a depression amount of an accelerator pedal with which the vehicle is provided, an odometer 17 which detects a running distance of the vehicle, and a water temperature sensor 16 which detects a cooling water temperature Tw of the diesel engine 1.

The difference of exhaust gas pressure upstream and downstream of the DPF 4 is equivalent to the pressure loss of the DPF 4. Regarding the fuel injection amount of the fuel injector 8, to prevent a large amount of smoke from being generated near full load of the diesel engine 1, a maximum injection amount is set beforehand as the fuel injection amount of the fuel injector 8 based on the intake air volume Q of each cylinder of the diesel engine 1 calculated from the air flowrate of the intake passage 2, and the rotation speed N calculated from the crank angle of the diesel engine 1.

The controller 11 calculates the basic fuel injection amount of the fuel injector 8 based on the accelerator pedal depression amount, adds a limit depending on the maximum injection amount to the basic fuel injection amount, and controls the fuel injection amount and fuel injection timing by outputting a pulse signal equivalent to the value after limitation to the fuel injector 8.

Regarding the regeneration of the DPF 4, the engine controller 11 calculates a particulate matter deposit amount of the DPF 4, and if the calculated value becomes equal to or greater than a reference value at which regeneration should be performed, starts regeneration of the DPF 4.

As stated above, regeneration of the DPF 4 is performed by raising the temperature of the exhaust gas by a method known in the art such as retarding the fuel injection timing of the fuel injector 8 or performing a post-injection after the main injection. The DPF 4 is formed in a cylindrical shape, exhaust gas flowing in from the front end, and flowing down the inside of the DPF 4 along the center axis to the rear end.

As mentioned above, during regeneration of the DPF 4, particulate matter situated a little downstream from the front end of the DPF 4 burns first, and combustion of particulate matter diffuses from this point to further downstream.

Although particulate matter deposited downstream from the point of burning start burns efficiently using the heat of combustion of upstream particulate matter, particulate matter deposited upstream of the spark, i.e., near the inlet, cannot burn easily.

According to experiments performed by the inventors, if regeneration of the DPF 4 is terminated or interrupted while combustion residues remain in the vicinity of the inlet, the differential pressure detected by the differential pressure sensor 12 during the subsequent non-regeneration period becomes notably large compared to the actual particulate matter deposit amount of the DPF 4.

Figure 2:
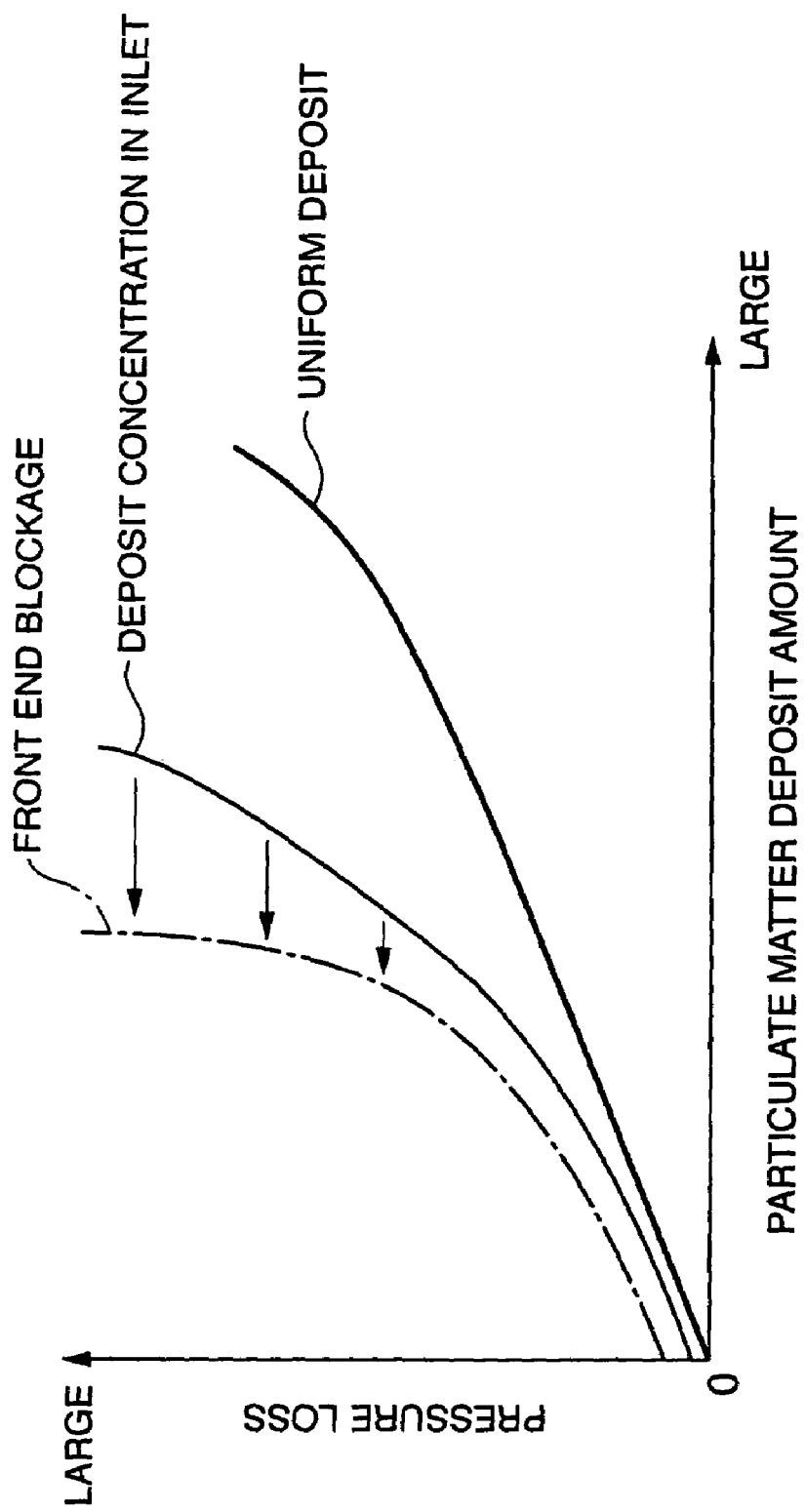
FIG. 2 is a diagram showing a relation of a particulate matter deposit amount in DPF and pressure loss according to the Inventors' research.

Referring to FIG. 2, according to experiments performed by the inventors, even for the same particulate matter deposit amount in the DPF, the pressure loss imparted by the DPF to the exhaust gas flow differs according to the deposition state.

When the particulate matter are uniformly deposited in the DPF 4, the pressure loss increases effectively in proportion to the deposit amount as shown by the thick solid line in the figure. On the other hand, if the particulate matter deposition is concentrated in the vicinity of the inlet, the pressure loss increase rate relative to the deposit amount increases as shown by the thin solid line in the figure, and for the same deposit amount, the pressure loss shows a larger value than when particulate matter are uniformly deposited in the DPF 4.

Further, when the DPF front end starts to be blocked due to particulate matter deposition in the vicinity of the inlet of the DPF, the pressure loss increases very rapidly as shown by the dotted line in the figure. Here, the pressure loss corresponds to the differential pressure detected by the differential pressure sensor 12.

Figure 3:
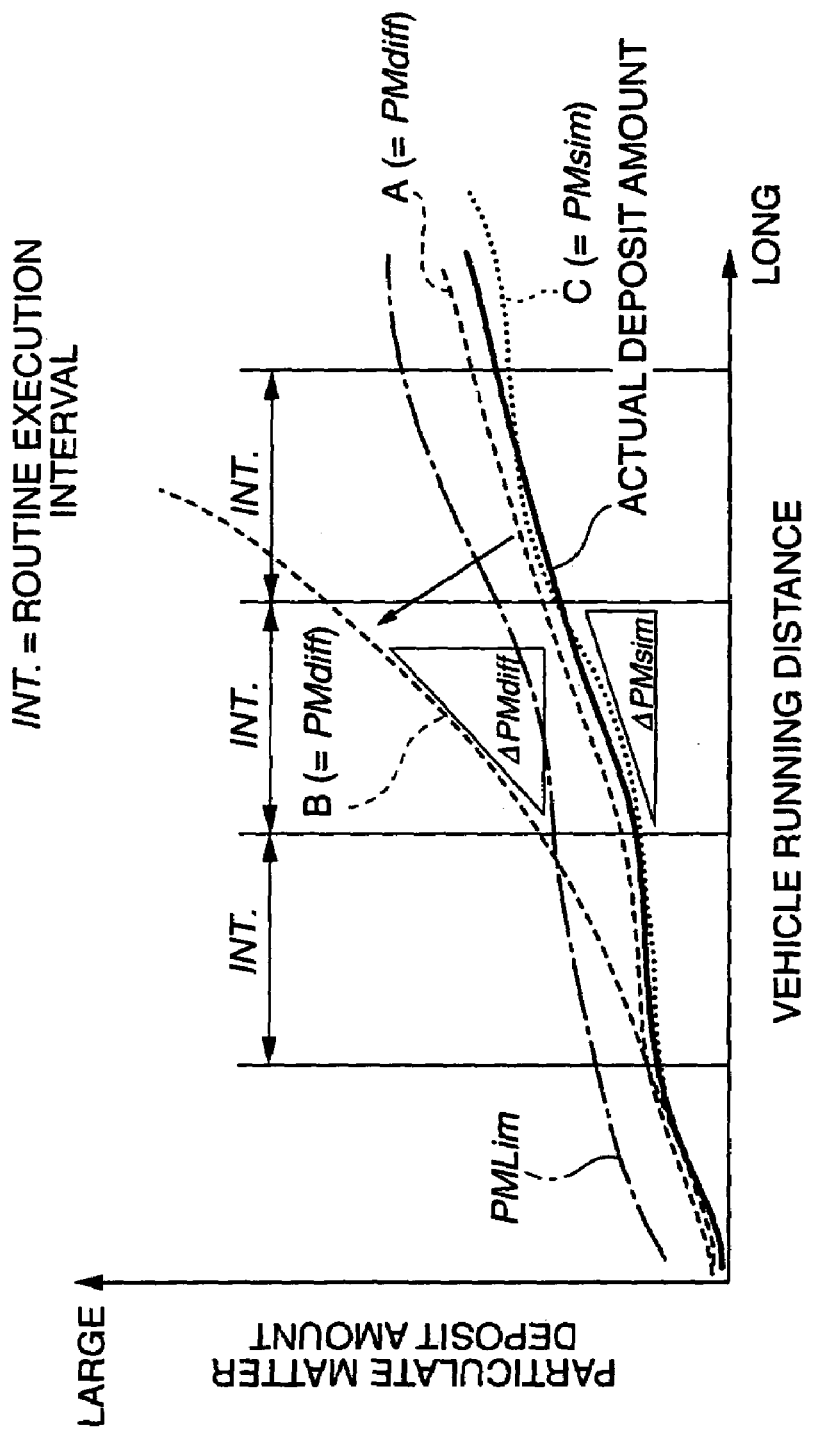
FIG. 3 is a diagram describing an algorithm for detecting a filter front end blockage according to this invention.

Next, referring to FIG. 3, the actual particulate matter deposit amount increases smoothly with the vehicle running distance as shown by the thick solid line. The reason why the increase rate is not constant in the figure is because driving conditions vary.

When the DPF 4 has completely regenerated, the particulate matter deposit amount calculated from the differential pressure detected by the differential pressure sensor 12 is a value very close to the actual deposit amount of the thick solid line, as shown by the dotted line A in the figure.

On the other hand, when the DPF 4 has partially regenerated, the particulate matter deposit amount detected by the differential pressure sensor 12 increases with a higher increase rate as the running distance increases, and shows a value which largely departs from the actual deposit amount given by the thick solid line, as shown by the dotted line B in the figure.

Therefore, if regeneration of the DPF 4 is determined based only on the differential pressure detected by the differential pressure sensor 12, the number of occasions when the deposit amount calculated from the differential pressure exceeds the reference value, increases although the actual deposit amount has not reached the reference value, so the DPF 4 is regenerated too frequently and fuel consumption increases.

When a simulation was performed based on the vehicle running distance, and the particulate matter deposit amount was estimated, it was found that it showed a value very close to the actual deposit amount, as shown by the dotted line C in the figure.

Based on the above analysis, in the exhaust gas purification device according to the present invention, the engine controller 11 determines whether or not there is a blockage of the front end of the DPF 4 by the following method.

Specifically, the deposit amount when the DPF 4 is not being regenerated, i.e., when the DPF 4 is trapping particulate matter, is calculated as a first particulate matter deposit amount PMdiff from the differential pressure upstream and downstream of the DPF 4 detected by the differential pressure sensor 12.

At the same time, the running distance after regeneration of the DPF 4 has completed is calculated from the vehicle running distance detected by the odometer 17, and the particulate matter deposit amount during this period is estimated as a second particulate matter deposit amount PMsim based on this running distance.

The engine controller 11 determines whether or not there is a blockage of the front end of the DPF 4 by comparing these two particulate matter deposit amounts PMdiff and PMsim.

Specifically, when the first particulate matter deposit amount PMdiff exceeds the second particulate matter deposit amount PMsim, and the first particulate matter deposit amount PMdiff is equal to or greater than a determining value PMLim of front end blockage, it is determined that there is a front end blockage of the DPF 4.

When particulate matter have deposited to a reference value and there is no front end blockage of the DPF 4, the time required to completely regenerate the DPF 4 is taken as a basic regeneration period t0, and stored beforehand in a memory (ROM) of the engine controller 11.

When the DPF 4 is to be regenerated, the engine controller 11 calculates a regeneration continuation period, and determines whether or not regeneration of the DPF 4 has completed based on a comparison of the regeneration continuation period and the basic regeneration period to.

However, as described above, during the period when the DPF 4 is not being regenerated, if it is determined that there is a front end blockage of the DPF 4, the engine controller 11 immediately starts regenerating the DPF 4 even if the first particulate matter deposit amount PMdiff has not reached the reference value. Further, in this case, regeneration of the DPF 4 is performed for a longer time than the basic regeneration period to.

Next, the routine executed by the engine controller 11 to perform the above control will be described referring to flowcharts.

Figure 4:
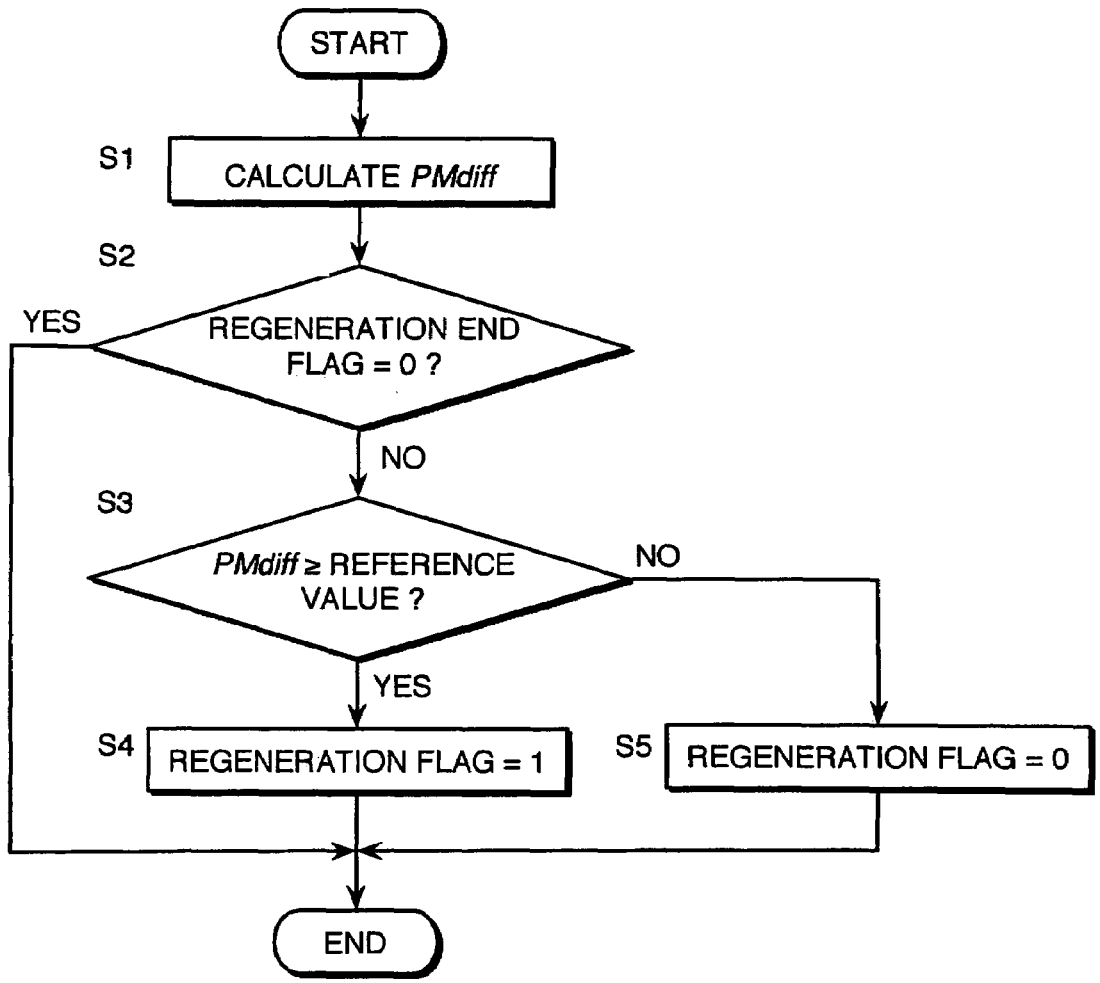
FIG. 4 is a flow chart describing a regeneration flag setting routine executed by a controller according to this invention.

Referring to FIG. 4, a regeneration flag setting routine will first be described.

The engine controller 11 executes this routine at intervals of ten milliseconds during running of the diesel engine 1.

The regeneration flag is a flag showing whether or not regeneration of the DPF 4 is required. The regeneration of the DPF 4 is executed when the regeneration flag changes from zero to unity as a trigger. The method, of regenerating the DPF 4 is known from the art, and will not be described here.

In a step S1, the engine controller 11 calculates the first particulate matter deposit amount PMdiff based on the differential pressure detected by the differential pressure sensor 12.

In a next step S2, the engine controller 11 determines whether or not a regeneration end flag is zero.

The setting of the regeneration end flag will be described later, but if the regeneration end flag is zero, it shows that regeneration of the DPF 4 has not terminated, i.e., the DPF 4 is still being regenerated.

The regeneration flag is a flag showing whether or not regeneration of the DPF 4 is required while it is trapping particulate matter, and must be set when the DPF 4 is trapping particulate matter, i.e., when it is not being regenerated.

If the determination of the step S2 is affirmative, i.e., during regeneration of the DPF 4, setting of the regeneration flag is not required, and the engine controller 11 immediately terminates the routine.

On the other hand, if the step S2 is negative, i.e., when the DPF 4 is trapping particulate matter, the engine controller 11, in a step S3, determines whether or not the first particulate matter deposit amount PMdiff is equal to or greater than the reference value stored in the ROM.

If the determination of the step S3 is affirmative, the engine controller 11, in a step S4, sets the regeneration flag to unity, and terminates the routine.

If the determination of the step S3 is negative, the engine controller 11, in a step S5, resets the regeneration flag to zero, and terminates the routine.

By setting the regeneration flag to unity, the engine controller 11 starts regeneration of the DPF 4 by executing a different routine.

Next, referring to FIG. 5, a routine for setting the regeneration end flag will be described.

The engine controller 11 executes this routine at intervals of ten milliseconds during running of the diesel engine 1.

First, in a step S11, the engine controller 11 determines whether or not the regeneration flag is unity.

When the regeneration flag is unity, regeneration of the DPF 4 is performed as described above.

In this case, the engine controller 11, in a step S12, determines whether or not the regeneration flag was unity on the immediately preceding occasion the routine was executed.

The determination of the step S12 determines whether or not the regeneration flag changed from zero to unity during execution of the present routine.

If the determination of the step S12 is negative, it means that regeneration of the DPF 4 was started simultaneously with execution of this routine.

In this case, the engine controller 11, in a step S13, resets a timer value t.

If the determination of the step S12 is affirmative, it means that regeneration of the DPF 4 is continuing.

In this case, the engine controller 11, in a step S14, increments the timer value t.

After the processing of the steps S13 or S14, the engine controller 11, in a step S15, determines whether or not the timer value t has reached the basic regeneration period to.

If the determination is affirmative, the engine controller 11 assumes that regeneration of the DPF 4 has completed, and in the step S17, sets the regeneration end flag to unity.

If the determination is negative, the engine controller 11 assumes that regeneration of the DPF 4 is continuing, and in a step S16, resets the regeneration end flag to zero.

After the processing of the step S16 or S17, the engine controller 11 terminates the routine.

The regeneration of the DPF 4 is terminated using the change of the regeneration end flag from unity to zero as a trigger.

On the other hand, if the regeneration flag is not unity in the step S11, regeneration of the DPF 4 is not taking place, and the DPF 4 is trapping particulate matter.

In this case, the engine controller 1 performs the processing of a step S18 and subsequent steps.

The processing of the step S18 and subsequent steps is the main feature of this invention.

In the step S18, the engine controller determines whether or not a blockage flag is unity. The setting of the blockage flag will be described later, but the blockage flag is a flag showing whether or not there is a front end blockage of the DPF 4. Even if the regeneration flag is zero, the regeneration of the DPF 4 is executed when the blockage flag has changed from zero to unity as a trigger.

If the blockage flag is not unity, the front end of the DPF 4 is not blocked. In this case, the engine controller 11 Immediately terminates the routine.

In the step S18, if the blockage flag is unity, the engine controller 11, in a step S19, determines whether or not the blockage flag was unity on the immediately preceding occasion the routine was executed.

The determination of the step S19 determines whether or not the blockage flag changed from zero to unity during current execution of the routine.

If the determination of the step S19 is negative, it means that the regeneration of the DPF 4 due to detection of front end blockage started simultaneously with execution of this routine.

In this case, the engine controller 11, in a step S20, resets the timer value t.

If the determination the step S19 is affirmative, it means that regeneration of the DPF 4 is continuing. In this case, the engine controller 11, in a step S21, increments the timer value t.

After the processing of the steps S20 or S21, the engine controller 11, in a step S22, determines whether or not the timer value t has reached an extended regeneration period tgen.

The extended regeneration period tgen is a value applied only when there is a front end blockage of the DPF 4, and is obtained by increasing the basic regeneration period to.

The method of calculating the extended regeneration period tgen will be described later.

If the determination of the step S22 is affirmative, the engine controller 11 assumes that regeneration of the DPF 4 has completed, and in a step S24, sets the regeneration end flag to unity.

If the determination of the step S22 is negative, the engine controller 11 assumes that regeneration of the DPF 4 is continuing, and in a step S23, resets the regeneration end flag zero.

After the processing of the steps S23 or S24, the engine controller 11 terminates the routine.

The regeneration of the DPF 4 due to front end blockage of the DPF 4 is also terminated when the regeneration end flag has changed from unity to zero as a trigger.

Next, referring to FIG. 6, a routine for determining blockage of the DPF front end will be described.

Figure 7:
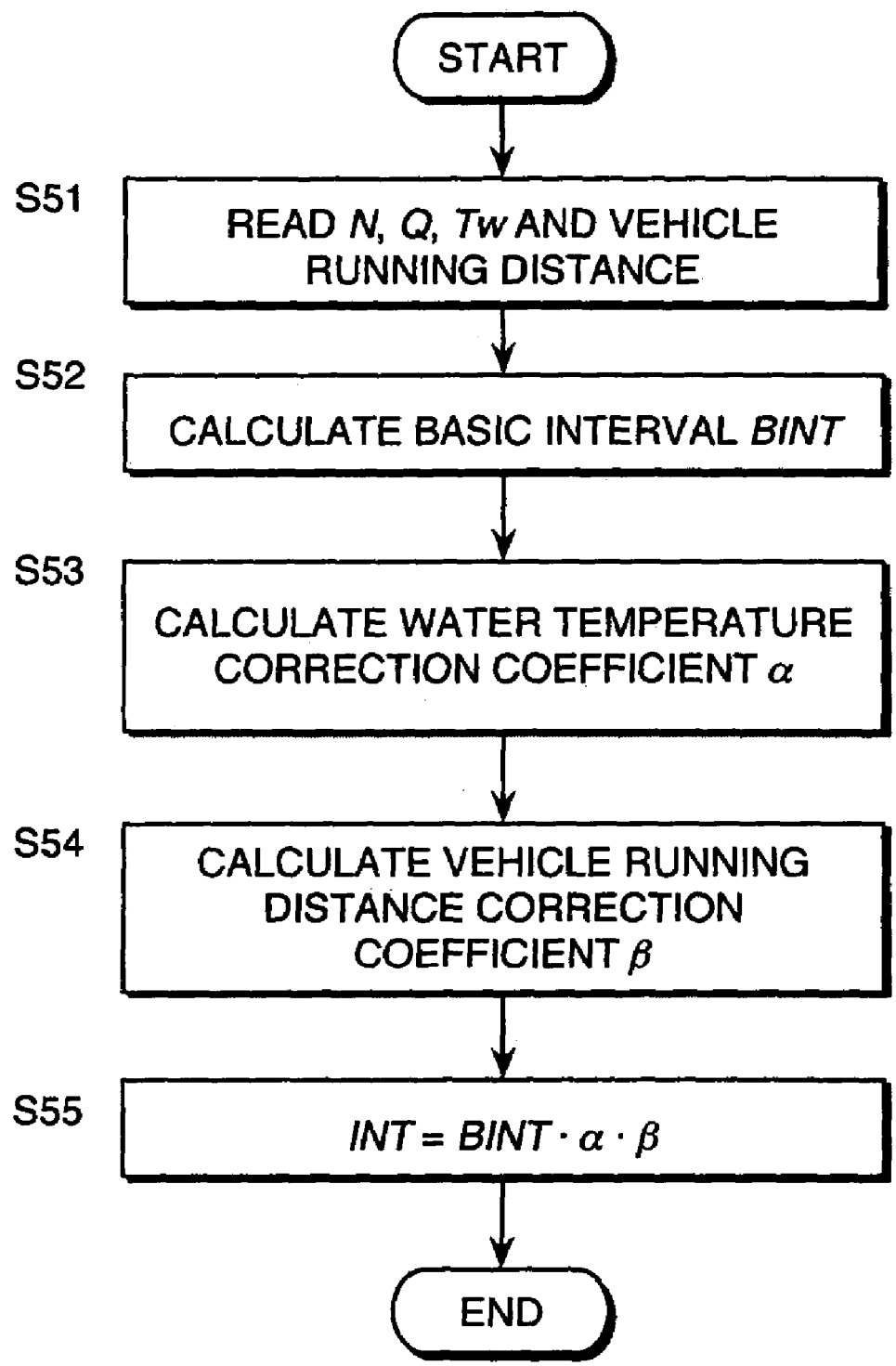
FIG. 7 is a flow chart describing an interval setting routine executed by the controller.

The engine controller 11 executes this routine at intervals INT computed by an interval setting routine shown in FIG. 7.

The interval setting routine of FIG. 7 will first be described.

The engine controller 11 executes this routine at intervals of ten milliseconds during running of the diesel engine 1.

In a step S51, the engine controller 11 calculates the rotation speed N of the diesel engine 1 based on a signal from the crank angle sensor 13.

The engine controller 11 also reads the fuel injection amount Q of the fuel injector 8, and the cooling water temperature Tw of the diesel engine 1 detected by the water temperature sensor 16.

The engine controller 11 further calculates a running distance from when the diesel engine 1 started operation based on the running distance detected by the odometer 17.

The fuel injection amount Q is determined by the engine controller 11 as described hereinabove, so it is a value known by the engine controller 11.

Figure 8:
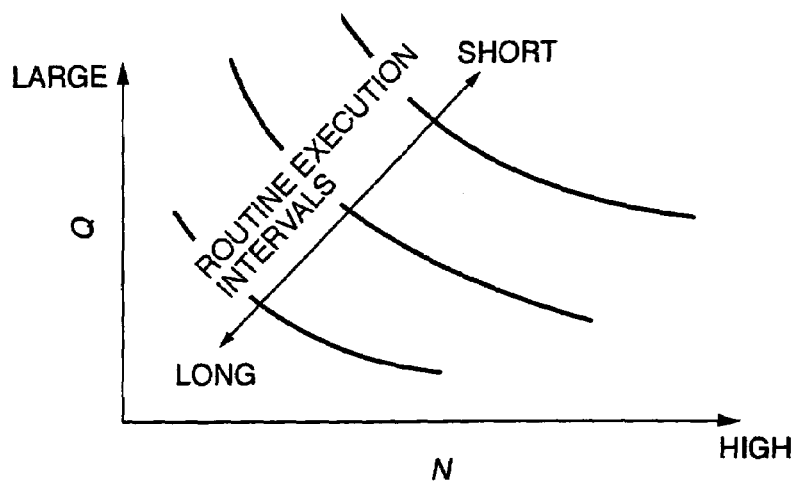
FIG. 8 is a diagram showing the characteristics of a basic interval map stored by the controller.

In a next step S52, the engine controller 111 calculates a basic interval BINT from the rotation speed N of the diesel engine 1 and the fuel injection amount Q of the fuel injector 8 by looking up a map having the characteristics shown in FIG. 8 which is stored beforehand in the ROM.

In this map, the basic interval BINT is set to be smaller, the higher the rotation speed N is, and the larger the fuel injection amount Q is.

Figure 9:
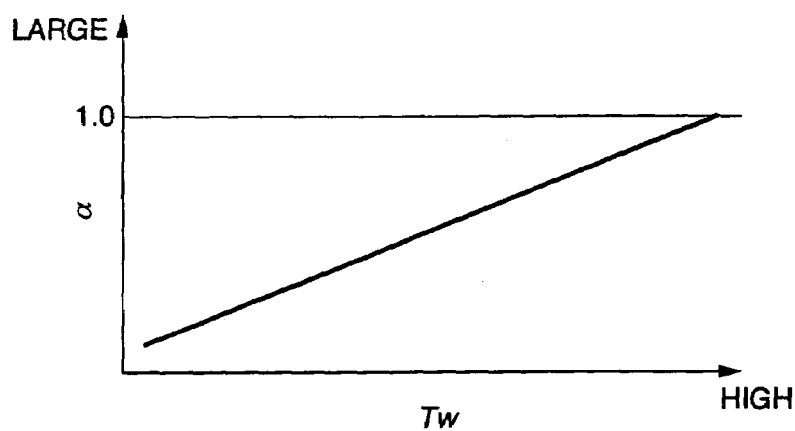
FIG. 9 is a diagram showing the characteristics of a map of a water temperature correction coefficient α stored by the controller.

In a next step S53, the engine controller 11 calculates a water temperature correction coefficient α from the cooling water temperature Tw by looking up a map having the characteristics shown in FIG. 9 which is stored beforehand in the ROM.

The water temperature correction coefficient α is a positive value equal to 1.0 or less, and is set to approach 1.0 as the water temperature Tw increases.

Figure 10:
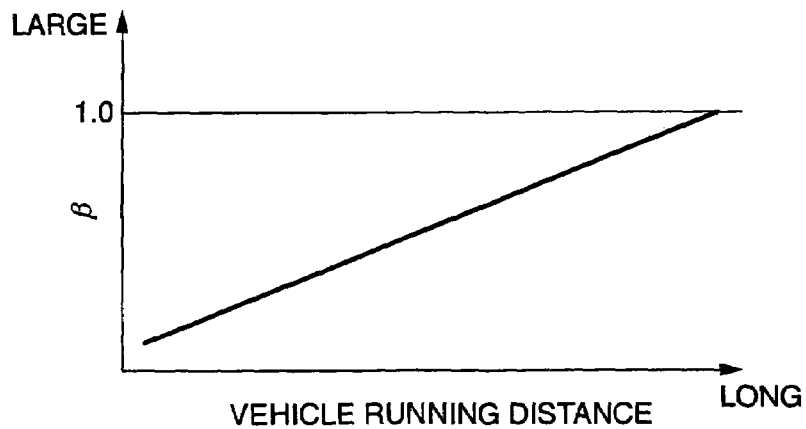
FIG. 10 is a diagram showing the characteristics of a map of a running distance correction coefficient β stored by the controller.

In a next step S54, the engine controller 11 calculates a running distance correction coefficient β based on the running distance from when the diesel engine 1 started, by looking up a map having the characteristics shown in FIG. 10 which is prestored in the ROM.

The running distance correction coefficient β is a positive value equal to or less than 1.0, and is set to approach 1.0 as the running distance from when the diesel engine 1 started, increases.

In a next step S55, the engine controller 11 calculates the interval INT by the following equation (1), and terminates the routine.

$$INT = BINT \cdot \alpha \cdot \beta \qquad (1)$$

The particulate matter discharge amount of the diesel engine increases as the load of the diesel engine increases and the rotation speed increases. If the diesel engine 1 has performed a cold start, or the running distance from start-up is short, the particulate matter discharge amount is large. By taking these factors into account, equation (1) sets the interval INT to be shorter, the larger the particular discharge amount is.

Figure 6:
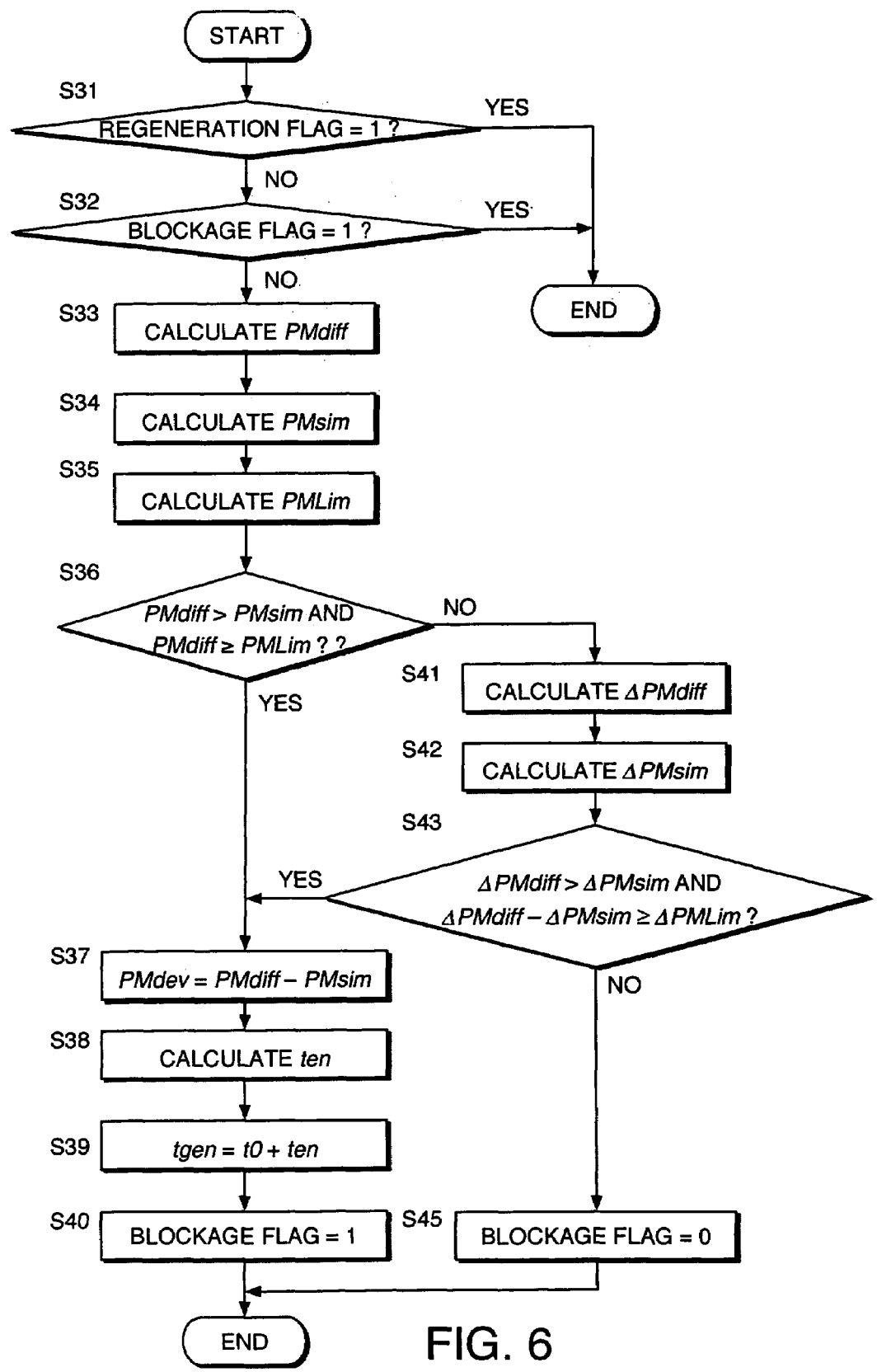
FIG. 6 is a flow chart describing a routine for determining blockage of the DPF front end executed by the controller.

The routine of FIG. 6 sets the blockage flag based on the interval INT set in this way, and permits high precision detection of front end blockage of the DPF 4.

Referring to FIG. 6, the engine controller 11, in a step S31, determines whether or not the regeneration flag is unity.

When the regeneration flag is not unity, in a step S32, it determines whether or not the blockage flag is unity. As described above, when the regeneration flag is unity or the blockage flag is unity, the regeneration of the DPF 4 is performed. The blockage flag is a flag showing front end blockage of the DPF 4 due to particulate matter deposition, and is necessarily set when regeneration of the DPF 4 is not being performed.

When the determination of the step S31 or S32 is affirmative, regeneration of the DPF 4 is taking place, and in this case, setting of the blockage flag is not required, so the engine controller 11 immediately terminates the routine without setting the blockage flag.

If the determination of the step S31 or S32 is negative, the DPF 4 is not being regenerated, and particulate matter are being trapped.

Figure 11:
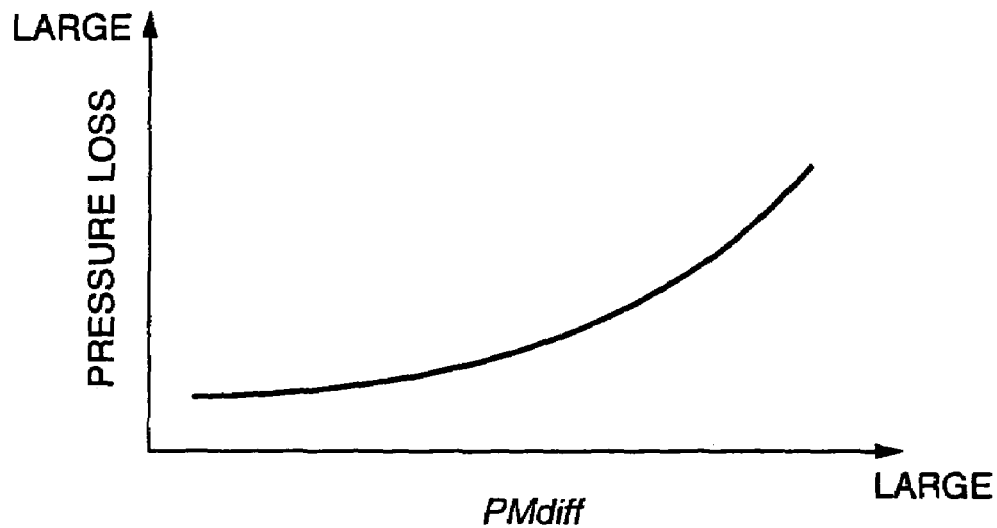
FIG. 11 is a diagram showing the characteristics of a map of a first particulate matter deposit amount PMdiff stored by the controller.

In this case, in a step S33, the engine controller calculates the first particulate matter deposit amount PMdiff by looking up a map having the characteristics shown in FIG. 11 which is stored beforehand in the ROM, based on the differential pressure detected by the differential pressure sensor 12.

In a next step S34, the engine controller 11 calculates the second particulate matter deposit amount PMsim based on the running distance.

Figure 12:
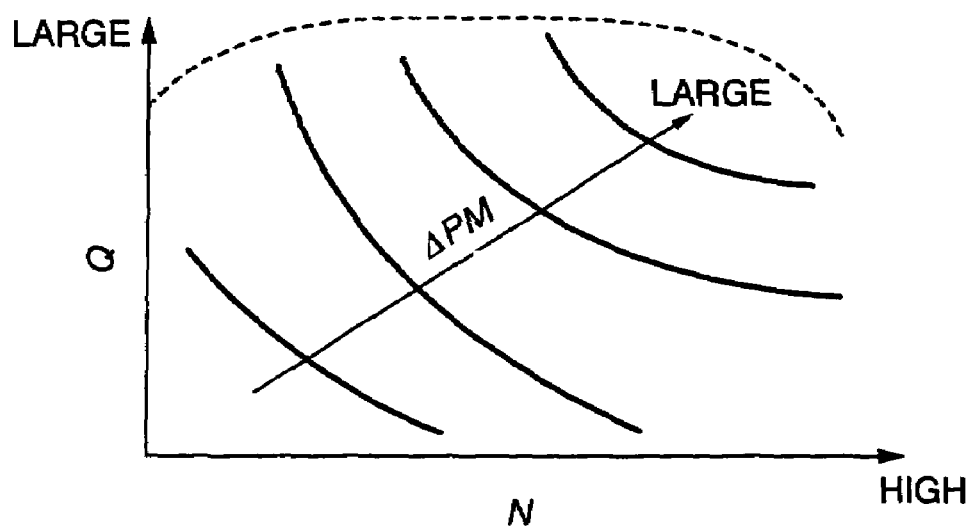
FIG. 12 is a diagram showing the characteristics of a particulate matter discharge amount ΔPM per unit time stored by the controller.

Specifically, a particulate matter discharge amount ΔPM per unit time of the diesel engine 1 is first calculated based on the fuel injection amount Q and rotation speed N of the diesel engine 1 by looking up a map having the characteristics shown in FIG. 12 which is stored beforehand in the ROM.

According to this map, the particulate matter discharge amount ΔPM per unit time increases with higher load and higher engine speed of the diesel engine 1.

The engine controller 11 calculates the second particulate matter deposit amount PMsim from the calculated discharge amount ΔPM, and the immediately preceding value PMsim (old) of the second particulate matter deposit amount PMsim calculated on the immediately preceding occasion the routine was executed, from the following equation (2).

$$PMsim = PMsim(\text{old}) + \Delta PM \cdot \frac{INT}{\text{UNIT TIME}} \text{ where,} \qquad (2)$$

UNIT TIME = unit time which is the basis for $\Delta PM$, and $INT$ = interval set by the routine of FIG. 7.

Figure 5:
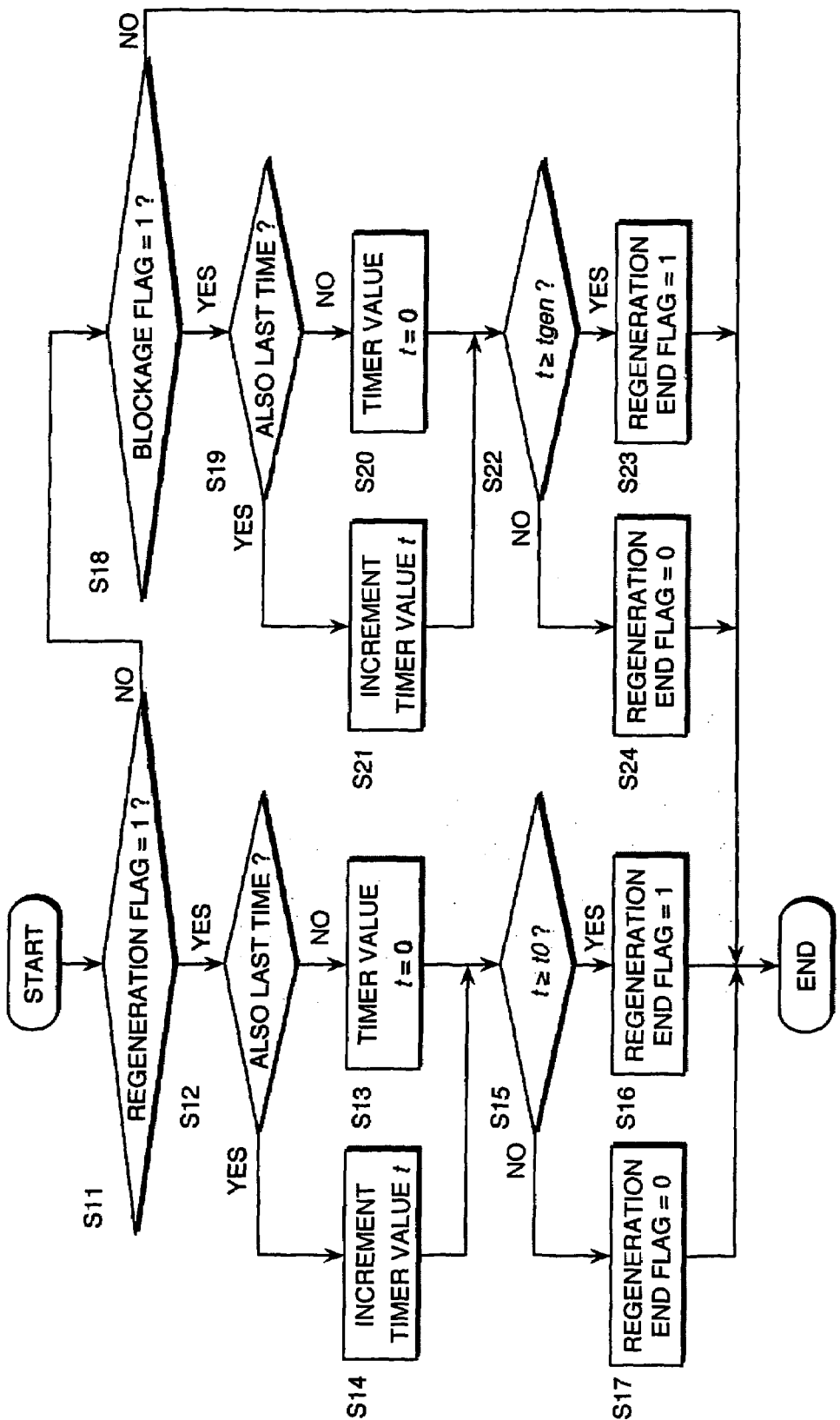
FIG. 5 is a flow chart describing a regeneration end flag setting routine executed by the controller.

The initial value of the second particulate matter deposit amount PMsim is zero, and in the step S17 or S24 of the routine of FIG. 5, the regeneration end flag is set to unity and then reset to zero.

In a next step S35, the engine controller 11 calculates a front end blockage determination value PMLim.

This calculation is performed by multiplying the second particulate matter deposit amount PMsim depending on the running distance, by a predetermined constant. The constant is a value larger than 1.0, and is set beforehand experimentally.

The determination value PMLim set in this way, as shown by the dot-and-dash line in FIG. 3, follows the particulate matter deposit amount calculated by simulation based on the vehicle running distance.

In a next step S36, the engine controller 11 determines whether or not the first particulate matter deposit amount PMdiff is larger than the second particulate matter deposit amount PMsim, and whether or not it is equal to or greater than the front end blockage determination value PMLim.

If this determination is affirmative, it is determined that there is a blockage in the front end of the DPF 4, and processing of the steps S37-S40 is performed.

In the step S36, the reason why the first particulate matter deposit amount PMdiff being greater than the front end blockage determination value PMLim is taken as a determination condition, is because it can definitively detect a front end blockage.

In the step S37, the engine controller 11 calculates a deviation PMdev of the first particulate matter deposit amount PMdiff from the second particulate matter deposit amount PMsim.

Figure 14:
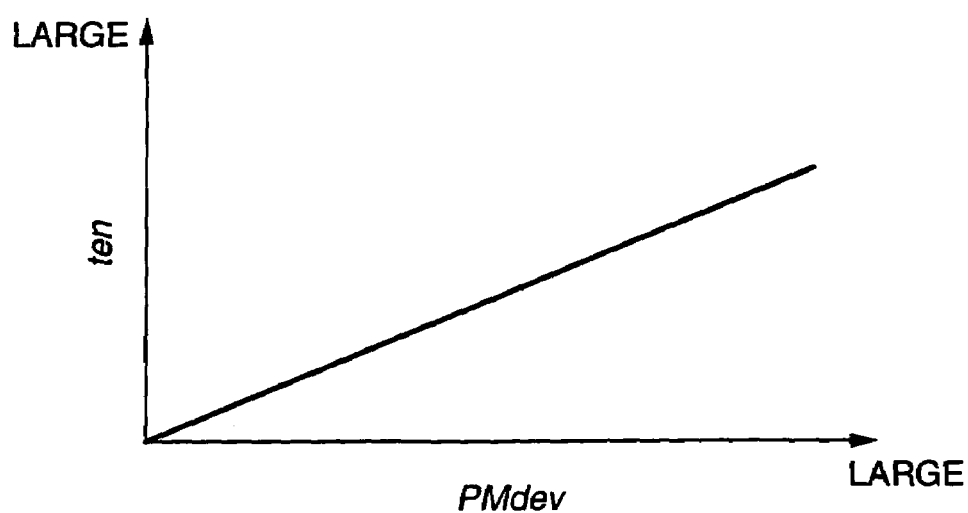
FIG. 14 is a diagram showing the characteristics of a regeneration addition period ten stored by the controller.

In a next step S38, the engine controller 11 calculates a regeneration addition period ten based on the deviation PMdev by looking up a map having the characteristics shown in FIG. 14 which is stored beforehand in the ROM.

According to this map, the regeneration addition period ten increases in linear proportion as the deviation PMdev increases.

In a next step S39, the engine controller 11, by adding the regeneration addition period ten to the basic regeneration period t0, calculates the extended regeneration period tgen.

The extended regeneration period tgen used for the determination of whether or not regeneration of the DPF 4 has completed in the step S22 of FIG. 5, is the value calculated here.

In a next step S40, the engine controller sets the blockage flag to unity. After the processing of the step S40, the engine controller 11 terminates the routine.

On the other hand, if the determination of the step S36 is negative, the controller 11, in a step S41, calculates an increase slope ΔPMdiff of the first particulate matter deposit amount PMdiff.

Specifically, the difference between the first particulate matter deposit amount PMdiff calculated in the step S33 during the present occasion of the routine, and the first particulate matter deposit amount PMdiff(old) calculated on the immediately preceding occasion the routine was executed, is set equal to the increase slope ΔPMdiff.

In a next step S42, the controller 11 calculates an increase slope ΔPMsim of the second particulate matter deposit amount PMsim.

Specifically, the difference between the second particulate matter deposit amount PMsim calculated during the present occasion of the routine, and the second particulate matter deposit amount PMsim(old) calculated on the immediately preceding occasion the routine was executed, is set equal to the increase slope ΔPMsim.

In a next step S43, the controller 11 determines whether or not the increase slope ΔPMdiff is greater than the increase slope ΔPMsim, and whether or not the difference between the increase slope ΔPMdiff and increase slope ΔPMsim is equal to or greater than a determination value ΔPMLim related to the increase slope of the front end blockage.

The determination value ΔPMLim relating to the increase slope of the front end blockage is obtained by subtracting a front end blockage determination value PMLim(odl) calculated in the step S35 on the immediately preceding occasion the routine was executed, from a front end blockage determination value PMLim calculated in the step S35 during the present execution of the routine.

If the determination of the step S43 is affirmative, the controller 11 determines that a blockage of the front end of the DPF 4 has occurred, and performs the processing of the aforesaid steps S37-S40.

In the step S43, the reason why the condition that the difference between the increase slope ΔPMdiff and the increase slope ΔPMsim is equal t6 or greater than the determination value ΔPMLim related to the increase slope of front end blockage, is taken as a determination condition, is to detect front end blockage without fail.

If the determination of the step S43 is negative, the controller 11 determines that a front end blockage of the DPF 4 has not occurred, resets the blockage flag to zero in a step S45, and terminates the routine.

In this routine, taking the detection value of the particulate matter deposit amount in the step S35 and the increase slope of the detection value in the step S43 as parameters, the presence or absence of front end blockage is determined in a two-stage process, so front end blockage can be detected with high precision.

As described above, due to execution of the routines of FIGS. 4-7, it can be detected with high precision whether or not a blockage of the DPF 4 occurred during trapping of the particulate matter. If a front end blockage was detected, regeneration of the DPF 4 is performed immediately, and regeneration is continued for the extended regeneration period tgen which is longer than the basic regeneration period to applied to normal regeneration, so the DPF 4 is completely regenerated including the removal of the front end blockage of the DPF 4.

If the DPF 4 is completely regenerated when a front end blockage of the DPF 4 is detected, the subsequent particulate matter trapping and regeneration cycle of the DPF 4 is normalized.

Therefore, by completely removing blockages, the regeneration frequency can be reduced, and as a result, fuel consumption can be reduced even if the fuel consumed for removing blockages is taken into account.

In the step S35 of FIG. 6, the determination value PMLim is calculated by multiplying the second particulate matter deposit amount PMsim by a predetermined constant, but it may be calculated also by another method.

Figure 13:
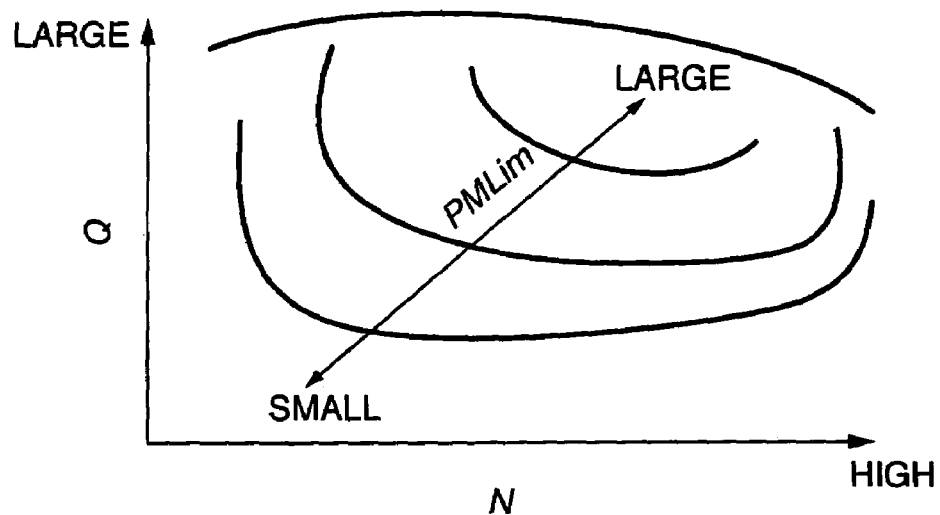
FIG. 13 is a diagram showing the characteristics of a map of a front end blockage determination value PMLim stored by the controller.

Specifically, the determination value PMLim can be determined using a map having the characteristics shown in FIG. 13 depending on the fuel injection amount Q and the rotation speed N of the diesel engine 1. In this case, the determination value PMLim does not depends on the elapsed time from the start of regeneration of the DPF 4, but as a constant value that is always larger than the value calculated in the step S35. When the front end blockage occurs, the particulate matter deposit amount PMdiff calculated from the differential pressure rapidly increases, so even if the determination value PMLim is set to such a large value that cannot be considered without the front end blockage, the precision of the determination as to whether or not there is a blockage of the front end of DPF 4 will not greatly be deteriorated.

The contents of Tokugan 2004-243312, with a filing date of Aug. 24, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, the front end blockage determination algorithms executed in the steps S36 and S43 of FIG. 6 have various variations.

Regarding the determination of the step S36, it may be determined that a front end blockage has occurred if the deviation PMdev of the first particulate matter deposit amount PMdiff from the second particulate matter deposit amount PMsim exceeds a predetermined tolerance range.

Also, it was determined whether or not there was a front end blockage from the two different conditions of the step S36 and S43, but one of these steps may be omitted.

In this embodiment, the execution interval INT of the DPF front end blockage determination routine of FIG. 6 was determined by the interval setting routine of FIG. 7, but the execution interval INT of the DPF front end blockage determination routine of FIG. 6 may also be taken as a constant interval.

The embodiments of this invention in which an exclusive property or privilege is claimed are defined as follows:

What is claimed is:

1. The front end blockage removal device for use with a regeneration device for a diesel particulate filter installed in an exhaust passage of a diesel engine, the filter having a front end facing upstream of the exhaust passage and trapping particulate matter in exhaust gas in the exhaust passage, the regeneration device regenerating the filter by burning the particulate matter trapped in the filter, the removal device comprising:

a sensor which detects a pressure loss in the exhaust gas of the exhaust passage due to the filter; and a programmable controller programmed to;

calculate a first particulate matter deposit amount of the filter based on the pressure loss;

calculate an increase slope of the first particulate matter deposit amount;

calculate a second particulate matter deposit amount of the filter based on a parameter other than the pressure loss;

calculate an increase slope of the second particulate matter deposit amount;

determine that a particulate matter blockage of the front end has occurred when the increase slope of the first particulate matter deposit amount is greater than the increase slope of the second particulate matter deposit amount, and the difference between the increase slope of the first particulate matter deposit amount and the increase slope of the second particulate matter deposit amount is equal to or greater than a predetermined determination value related to the increase slope; and control the regeneration device to regenerate the filter when the particulate matter blockage of the front end has occurred.

2. The front end blockage removal device as defined in claim 1, wherein the controller is further programmed to set the predetermined determination value related to the increase slope as a variation amount per predetermined time of a value obtained by multiplying the second particulate matter deposit amount by a predetermined constant larger than 1.0.

3. A front end blockage removal device for use with a regeneration device for a diesel particulate filter installed in an exhaust passage of a diesel engine for driving a vehicle, the filter having a front end facing upstream of the exhaust passage and trapping particulate matter in exhaust gas passage, the regeneration device regenerating the filter by burning the particulate matter trapped in the filter, the removal device comprising:

a sensor which detects a pressure loss in the exhaust gas of the exhaust passage due to the filter; and a programmable controller programmed to:

calculate a first particulate matter deposit amount of the filter based on the pressure loss;

calculate a second particulate matter deposit amount of the filter based on a parameter other than the pressure loss;

determine whether or not a particulate matter blockage of the front end has occurred based on the first particulate matter deposit amount and second particulate matter deposit amount; and control the regeneration device to regenerate the filter when the particulate matter blockage of the front end has occurred, wherein the controller is further programmed to repeatedly determine whether or not there is a front end particulate matter blockage at a predetermined interval, calculate a particulate matter discharge amount per interval of the diesel engine based on a fuel injection amount and a rotation speed of the diesel engine, and calculate the second particulate matter deposit amount used in the present determination by adding the particulate matter discharge amount per interval of the diesel engine to the second particulate matter deposit amount calculated in the immediately preceding determination.

4. The front end blockage removal device as defined in claim 3, wherein the controller is further programmed to set the predetermined interval based on the fuel injection amount and the rotation speed of the diesel engine.

5. The front end blockage removal device as defined in claim 4, wherein the controller is further programmed to set the predetermined interval to be a smaller value, as the fuel injection amount and the rotation speed increases.

6. The front end blockage removal device as defined in claim 3, wherein the controller is further programmed to correct the predetermined interval to be a smaller value, as a cooling water temperature of the diesel engine lowers.

7. The front end blockage removal device as defined in claim 3, wherein the controller is further programmed to correct the predetermined interval to be a smaller value, as a vehicle running distance from startup of the diesel engine increases.

8. The front end blockage removal device as defined in claim 1 wherein the controller is further programmed to control the regeneration device to perform regeneration of the filter for a period obtained by adding a regeneration addition period to a predetermined basic regeneration period.

9. The front end blockage removal device as defined in claim 8, wherein the predetermined basic regeneration period is a time required to regenerate the filter when there is no front end particulate matter blockage.

10. The front end blockage removal device as defined in claim 8, wherein the controller is further programmed to calculate the regeneration addition period to be a larger value, as a difference between the first particulate matter deposit amount and the second particulate matter deposit amount increases.

11. The front end blockage removal device as defined in claim 1, wherein the regeneration device is a device which regenerates the filter when the first particulate matter deposit amount reaches a predetermined amount, and the controller is further programmed to control the regeneration device to regenerate the filter when the front end particulate blockage has occurred, even if the first particulate matter deposit amount has not reached the predetermined amount.

12. A front end blockage removal device for use with a regeneration device for a diesel particulate filter installed in an exhaust passage of a diesel engine, the filter having a front end facing upstream of the exhaust passage and trapping particulate matter in exhaust gas in the exhaust passage, the regeneration device regenerating the filter by burning the particulate matter trapped in the filter, the removal device comprising:

means for detecting a pressure loss in the exhaust gas of the exhaust passage due to the filter;

means for calculating a first particulate matter deposit amount of the filter based on the pressure loss;

means for calculating a second particulate matter deposit amount of the filter based on a parameter other than the pressure loss;

means for calculating an increase slope of the first particulate matter deposit amount;

means for calculating a second particulate matter deposit amount of the filter based on a parameter other than the pressure loss;

means for calculating an increase slope of the second particulate matter deposit amount;

means for determining that a particulate matter blockage of the front end has occurred when the increase slope of the first particulate matter deposit amount is greater than the increase slope of the second particulate matter deposit amount, and the difference between the increase slope of the first particulate matter deposit amount and the increase slope of the second particulate matter deposit amount is equal to or greater than a predetermined determination value related to the increase slope; and means for controlling the regeneration device to regenerate the filter when the particulate matter blockage of the front end has occurred.

13. A front end blockage removal method for a regeneration device for a diesel particulate filter installed in an exhaust passage of a diesel engine, the filter having a front end facing upstream of the exhaust passage and trapping particulate matter in exhaust gas in the exhaust passage, the regeneration device regenerating the filter by burning the particulate matter trapped in the filter, the method comprising:

detecting a pressure loss in the exhaust gas of the exhaust passage due to the filter;

calculating a first particulate matter deposit amount of the filter based on the pressure loss;

calculating a second particulate matter deposit amount of the filter based on a parameter other than the pressure loss;

calculating a second particulate matter deposit amount of the filter based on a parameter other than the pressure loss;

calculating an increase slope of the second particulate matter deposit amount;

determining that a particulate matter blockage of the front end has occurred when the increase slope of the first particulate matter deposit amount is greater than the increase slope of the second particulate matter deposit amount, and the difference between the increase slope of the first particulate matter deposit amount and the increase slope of the second particulate matter deposit amount is equal to or greater than a predetermined value related to the increase slope; and controlling the regeneration device to regenerate the filter when it is determined that there is a particulate matter blockage of the front end.

* * * * *